US008057772B2

(12) United States Patent
Kim et al.

(10) Patent No.: US 8,057,772 B2
(45) Date of Patent: Nov. 15, 2011

(54) MESOPOROUS SILICA PARTICLES AND PREPARATION METHOD THEREOF

(75) Inventors: Jong-Yun Kim, Daejeon (KR); Suk Bon Yoon, Daejeon (KR); Yong-Joon Park, Daejeon (KR); Myung Ho Lee, Daejeon (KR); Kwang-Yong Jee, Daejeon (KR)

(73) Assignee: Korea Atomic Energy Research Institute, Daejeon-si (KR)

( * ) Notice: Subject to any disclaimer, the term of this patent is extended or adjusted under 35 U.S.C. 154(b) by 1033 days.

(21) Appl. No.: 11/877,250

(22) Filed: Oct. 23, 2007

(65) Prior Publication Data

US 2008/0286187 A1 Nov. 20, 2008

(30) Foreign Application Priority Data

May 15, 2007 (KR) .................. 10-2007-0047059

(51) Int. Cl.
*C01B 33/12* (2006.01)
*C01B 33/154* (2006.01)
*C01B 33/146* (2006.01)

(52) U.S. Cl. ........ 423/335; 423/337; 423/338; 423/339; 423/705

(58) Field of Classification Search .......... 423/335–340, 423/705
See application file for complete search history.

(56) References Cited

U.S. PATENT DOCUMENTS

| | | | |
|---|---|---|---|
| 5,057,296 A | 10/1991 | Beck | |
| 5,102,643 A | 4/1992 | Kresge et al. | |
| 6,027,706 A | 2/2000 | Pinnavaia et al. | |
| 6,054,111 A | 4/2000 | Antonietti et al. | |
| 7,018,596 B2 * | 3/2006 | Satou et al. | 423/335 |
| 2004/0267038 A1 * | 12/2004 | Tatsumi et al. | 556/413 |

OTHER PUBLICATIONS

Michal Kruk and Mietek Jaroniec, "A Unified Interpretation of High-Temperature Pore Size Expansion Processes in MCM-41 Mesoporous Silicas" J. Phys. Chem B 2003 (1999) pp. 4590-4598.*
Abdelhamid Sayari, et al., Applications of Pore-Expanded Mesoporous Silica. 1. Removal of Heavy Metal Cations and Organic Pollutants from Wastewater, 2005 American Chemical Society, pp. 212-216, Dec. 4, 2004.
Katsunori Kosuge, et al., Rapid Synthesis of Al-Containing Mesoporous Silica Hard Spheres of 30-50 μm Diameter, 2001 American Chemical Society, pp. 2476-2482, Jul. 17, 2001. Chia-Pei Kao, et al., Synthesis of elastic macrospheres of silica-surfactant nanocomposites, Journal of Physics and Chemistry of Solids 62 (2001), pp. 1555-1559, Dec. 2000.
Hong-Ping Lin et al., Structural and Morphological Control of Cationic Surfactant-Templated Mesoporous Silica, Accounts of Chemical Research vol. 35, No. 11, 2002, pp. 927-935, Aug. 16, 2002.

* cited by examiner

*Primary Examiner* — Stanley Silverman
*Assistant Examiner* — Diana J Liao
(74) *Attorney, Agent, or Firm* — H.C. Park & Associates, PLC

(57) ABSTRACT

Disclosed are mesoporous silica particles and a preparation method thereof, particularly, a method of preparing mesoporous silica particles, including mixing a silica precursor, an alkylamine-based surfactant, and a phosphoric acid-based cosurfactant, thus preparing a mixture solution (a mother liquor); adding or not adding the mixture solution with an acid solution, and conducting stirring, thus providing mesoporous silica particles; and thermally treating the mesoporous silica particles. These mesoporous silica particles are prepared using a phosphoric acid-based cosurfactant for stabilizing the surface of the particles to prevent the aggregation thereof, thereby uniformly distributing the particles. Through a hydrothermal reaction, the mesoporous silica particles have various pore sizes, a large surface area, and a high pore volume, and thus are widely used in catalysts, adsorbents, low dielectrics, and separation and purification processes, and are useful as templates for the preparation of novel porous materials, including porous carbon.

8 Claims, 4 Drawing Sheets

MESOPOROUS SILICA PARTICLES AND PREPARATION METHOD THEREOF

This application claims priority from and the benefit of Korean Patent Application No. 10-2007-0047059, filed on May 15, 2007, which is hereby incorporated by reference for all purposes as if fully set forth herein.

BACKGROUND OF THE INVENTION

1. Field of the Invention

The present invention relates to mesoporous silica particles having various sizes and a method of preparing the same.

2. Description of the Related Art

Mesoporous silica is one kind of mesoporous molecular sieve. This is a mesoporous molecular sieve in which pores having a uniform size are regularly arranged. A new family of mesoporous molecular sieve materials, designated as M41S, which were synthesized using an ionic surfactant as a structure-directing agent by researchers at Mobil in 1991, are disclosed in U.S. Pat. Nos. 5,057,296 and 5,102,643. Ever since, the mesoporous molecular sieve materials have been used in various application fields, and thorough research thereon is being conducted all over the world.

Unlike the synthesis of conventional molecular sieves, the mesoporous molecular sieves are synthesized through a liquid-crystal templating mechanism, which is advantageous because the types of surfactant serving as a templating material or the synthesis conditions in the synthesis route are controlled, thereby making it possible to adjust the pore size to 1.6~10 nm.

U.S. Pat. Nos. 6,027,706 and 6,054,111 disclose mesoporous materials prepared using amphiphilic block copolymers as nonionic surfactants. In the case of zeolite, a monomolecular inorganic or organic material generally acts as a templating material for inducing a pore structure, while, in the case of a mesoporous material, a micelle structure, in which multiple surfactant molecules are assembled, is used to induce pores, instead of the monomolecular material. The surfactant, consisting generally of a hydrophilic head portion and a hydrophobic tail portion, is known to constitute various self-assembled micelle and liquid-crystal structures in the presence of an aqueous solution. Located at the surface of the micelle or liquid-crystal structure, the hydrophilic portion interacts with an inorganic precursor to form an organic/inorganic nanocomposite, from which the surfactant is then removed, thus attaining the mesoporous material. The mesoporous material may have a pore size increased to the mesopore range (2~10 nm), compared to conventional microporous materials having a pore size of 1.5 nm or less, such as zeolite or AlPO-based materials, thereby enabling the application of molecular sieve materials to fields in which the application thereof has been limited until now, for example, adsorption and separation of molecules having a larger pore size than microporous materials, and catalytic conversion reactions. The mesoporous material having regular pores has a very large surface area (>700 m$^2$/g) and thus exhibits superior properties that are able to adsorb atoms or molecules. Further, because the mesoporous material has a uniform pore size, it is used as the carrier of catalyst activators, such as transition metal compounds or amine-based oxides. Furthermore, the mesoporous material is expected to be applied as conductive materials, optical display materials, chemical sensors, fine chemicals and bio-powders, novel insulators having mechanical or thermal properties, and packaging materials, and to have many applications.

To date, research into the synthesis of spherical mesoporous silica nanoparticles smaller than 1 μm and control of the morphology thereof has been extensively conducted to elucidate special physical and chemical properties. However, mesoporous silica particles having a particle size of 10 μm or more are almost impossible to synthesize through the method based on the Stöber process, which is used to synthesize conventional mesoporous particles. On the other hand, few study results on synthesis of mesoporous silica particles larger than 100 μm have been reported [H.-P. Lin and C.-Y. Mou, *Acc. Chem. Res.*, 2002, 35, 927; C.-P. Kao, H.-P. Lin and C.-Y. Mou, *J. Phys. Chem. Solids*. 2001, 62, 1555].

Further, methods of synthesizing mesoporous silica particles having a size of 30~50 μm have recently been reported [K. Kosuge and P. S. Singh, *Chem. Mater.*, 2001, 13, 2476]. However, because the synthesized mesoporous silica has a mesopore diameter smaller than 4 nm, many problems may occur when active materials are introduced from the outside.

Although various synthesis methods for adjusting the pore size through the introduction of an organic additive, such as a hydrocarbon, alcohol, or ether, as a swelling agent are known, it is still difficult to prepare silica having mesopores larger than 10 nm using an organic template. Hence, studies on methods of increasing the mesopore size are urgently required.

These days, mesoporous silica, MCM-41, having a very large pore size, is synthesized by introducing N,N-dimethyldecylamine as a swelling agent for increasing pore size [A. Sayari, S. Hamoudi and Y. Yang, *Chem. Mater.*, 2005, 17, 212]. However, the above synthesis method suffers because it has a complicated preparation process and cannot increase the pore size beyond 30 nm.

SUMMARY OF THE INVENTION

Leading to the present invention, intensive and thorough research into the synthesis of mesoporous silica particles having an increased pore size, carried out by the present inventors aiming to solve the problems encountered in the related art, resulted in the finding that a conventional alkylamine-based surfactant may be added with a phosphoric acid-based surfactant, whereby mesoporous silica particles having a micrometer size, a large surface area, a high pore volume, and a uniform pore size may be directly synthesized, and furthermore, because the particle size may vary under various synthesis conditions, it is possible to easily adjust the particle size to 1~1000 μm and the pore size to 150 nm depending on the compositions of reaction materials and the conditions for hydrothermal reaction.

Accordingly, the present invention provides a method of synthesizing mesoporous silica particles having various pore sizes, using an alkylamine-based surfactant and a phosphoric acid-based cosurfactant.

In addition, the present invention provides mesoporous silica particles prepared using the above method.

BRIEF DESCRIPTION OF THE DRAWINGS

FIG. 2 is transmission electron microscope (TEM) images illustrating the mesoporous silica particles prepared according to the present invention and comparative examples, wherein:

Figure 3:
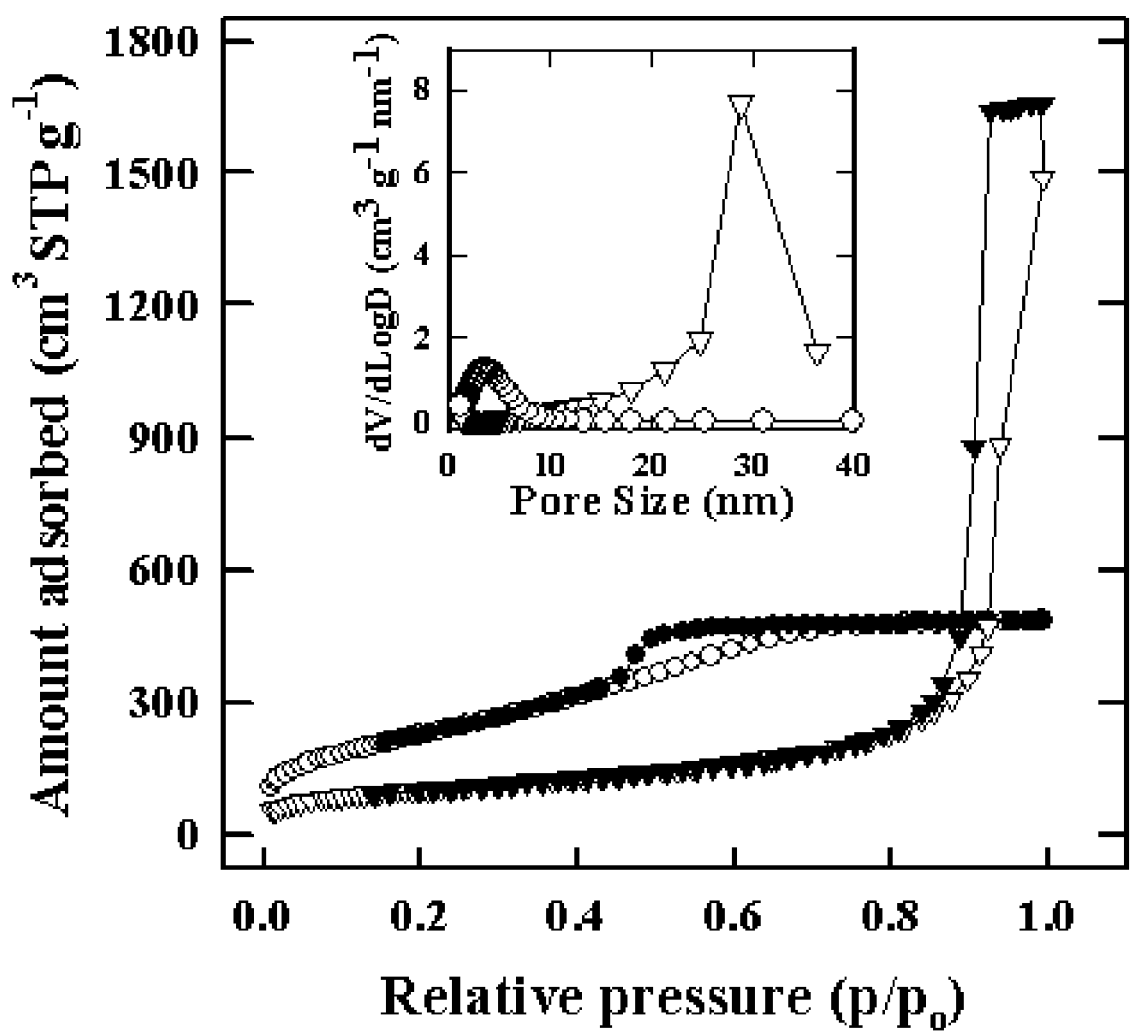
Figure 4:
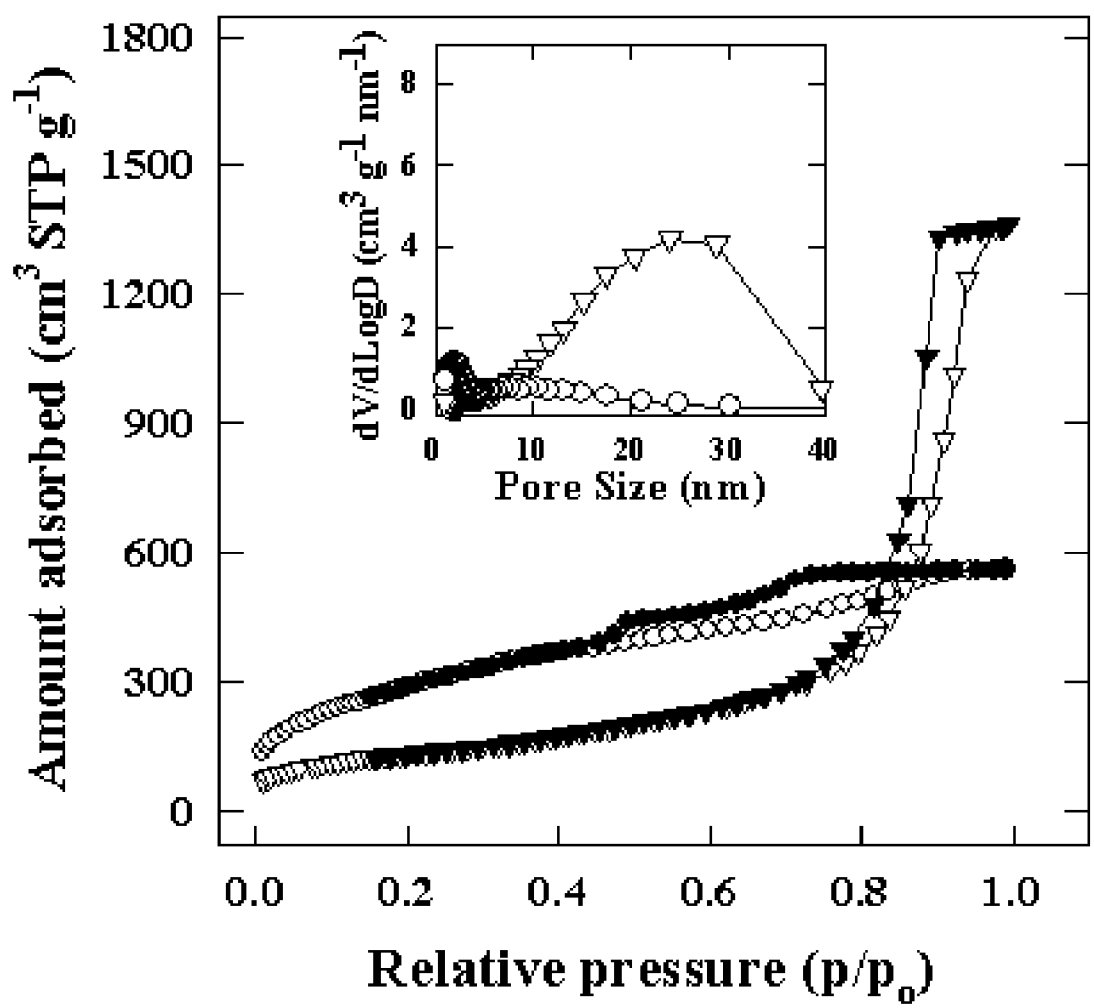

(a) illustrates the case in which only an alkylamine-based surfactant is added, according to a first comparative example, (b) illustrates the case in which an alkylamine-based surfactant is added with a phosphoric acid-based cosurfactant, according to the present invention, (c) illustrates the mesoporous silica particles having an increased pore size, obtained by further subjecting the mesoporous silica particles prepared with the addition of only an alkylamine-based surfactant to a hydrothermal reaction, according to a second comparative example, and (d) illustrates the mesoporous silica particles having an increased pore size, obtained by further subjecting the mesoporous silica particles, prepared with the addition of an alkylamine-based surfactant and a phosphoric acid-based cosurfactant, to a hydrothermal reaction, according to the present invention;

FIG. 3 is a nitrogen adsorption/desorption isotherm graph illustrating the mesoporous silica particles prepared with the addition of the alkylamine-based surfactant and the phosphoric acid-based cosurfactant, and the mesoporous silica particles having an increased pore size obtained after a hydrothermal reaction is further conducted, according to the present invention, and a pore size distribution curve corresponding thereto, and FIG. 4 is a nitrogen adsorption/desorption isotherm graph illustrating the mesoporous silica particles prepared with the addition of the alkylamine-based surfactant, and the mesoporous silica particles having an increased pore size obtained after a hydrothermal reaction is further conducted, according to the comparative examples, and a pore size distribution curve corresponding thereto, wherein:

○: indicates nitrogen adsorption in the case where a hydrothermal reaction is not conducted, ▽: indicates nitrogen adsorption in the case where a hydrothermal reaction is conducted, ●: indicates nitrogen desorption in the case where a hydrothermal reaction is not conducted, and ▼: indicates nitrogen desorption in the case where a hydrothermal reaction is conducted.

DESCRIPTION OF THE PREFERRED EMBODIMENTS

According to the present invention, there is provided a method of preparing mesoporous silica particles, including (1) mixing a silica precursor, an alkylamine-based surfactant, and a phosphoric acid-based cosurfactant, thus preparing a mixture solution (a mother liquor); (2) adding or not adding the mixture solution with an acid solution, and conducting stirring, thus obtaining mesoporous silica particles; and (3) thermally treating the mesoporous silica particles.

As such, subjecting the mesoporous silica particles obtained after stirring to a hydrothermal reaction in the presence of the mother liquor in order to increase the pore size of the mesoporous silica particles may be further included.

In addition, according to the present invention, there is provided a method of preparing mesoporous silica particles, including (1) mixing a silica precursor, an alkylamine-based surfactant, and a phosphoric acid-based cosurfactant, thus preparing a mixture solution (a mother liquor); (2) adding or not adding the mixture solution with an acid solution, and immediately conducting a hydrothermal reaction to increase the pore size of mesoporous silica particles, thus obtaining mesoporous silica particles having an increased pore size; and (3) thermally treating the mesoporous silica particles.

Further, according to the present invention, mesoporous silica particles prepared using the above method are provided.

Hereinafter, a detailed description will be given of the present invention.

In the present invention, step (1) is a process of preparing the mixture solution (mother liquor) including the silica precursor, the alkylamine-based surfactant, and the phosphoric acid-based cosurfactant.

In the preparation of the mesoporous silica particles according to the present invention, the silica precursor is used as a main material of the mesoporous silica particles, and examples thereof include, but are not limited to, tetramethyl orthosilicate, tetraethyl orthosilicate, tetrapropyl orthosilicate, tetrabutyl orthosilicate, or mixtures thereof.

In the preparation of the mesoporous silica particles according to the present invention, the alkylamine-based surfactant is used as a material for forming the structure of the mesoporous silica particles, and examples thereof include, but are not limited to, straight or branched chain alkylamine having 4~24 carbons. Particularly useful is n-dodecylamine.

In the preparation of the mesoporous silica particles according to the present invention, the phosphoric acid-based cosurfactant functions to increase the pore size of the mesoporous silica particles and to stabilize the surface of the mesoporous silica particles such that the particles are not aggregated but are uniformly dispersed. In the present invention, various phosphoric acid-based cosurfactants may be used, and examples thereof include, but are not limited to, phosphorous acid derivatives, phosphoric acid derivatives, phosphonic acid derivatives, and phosphinic acid derivatives. Preferably, di-(2-ethylhexyl)phosphoric acid is useful.

The silica precursor, the alkylamine-based surfactant, and the phosphoric acid-based cosurfactant may be mixed at various molar ratios, and preferably the molar ratio of silica precursor to alkylamine-based surfactant to phosphoric acid-based cosurfactant is 1:01~0.5:0.00001~0.5.

In the preparation of the mesoporous silica particles according to the present invention, a reaction solvent, which is exemplified by water, alcohol, or a mixture thereof, may be used.

Subsequently, step (2) is a process of adding or not adding the mixture solution with the acid solution, and conducting stirring, thus providing the mesoporous silica particles.

In the preparation of the mesoporous silica particles according to the present invention, the mixture solution may be allowed to react under acidic conditions to increase the reaction rate. To this end, an acid solution, including hydrochloric acid, nitric acid, or sulfuric acid, may be used. The concentration of the acid solution varies depending on the amount of the silica precursor, and the molar ratio of the silica precursor to the acid solution may be 1:0.00001~0.4.

These reaction materials are stirred for a predetermined period of time, thereby obtaining mesoporous silica particles composed of surfactant/cosurfactant/silica.

Further, subjecting the mesoporous silica particles obtained after stirring to a hydrothermal reaction in the presence of the mother liquor in order to increase the pore size of the mesoporous silica particles may be included.

The hydrothermal reaction may be conducted at 50~250° C. for 1~24 hours using a closed high-temperature/high-pressure reactor, and the pore size of the mesoporous silica particles may be increased about 20 times or more through the hydrothermal reaction.

The mesoporous silica particles also may be prepared by adding or not adding the mixture solution with the acid solution, and immediately conducting a hydrothermal reaction to thus increase the pore size of the mesoporous silica particles.

The mesoporous silica particles formed may be separated, washed, and dried through typical methods, and specifically are separated from the mother liquor through filtration using filter paper, washed with ethanol, and dried in an oven.

Subsequently, step (3) is a process of thermally treating the mesoporous silica particles.

In this step, the mesoporous silica particles containing the surfactant component prepared, are thermally treated at 300~900° C. for 1~24 hours to remove the surfactant component therefrom, thereby obtaining the mesoporous silica particles.

In this way, when the mesoporous silica particles are prepared, the molar ratio of the silica precursor, the alkylamine-based surfactant, and the phosphoric acid-based cosurfactant is controlled, and the stirring rate and the hydrothermal reaction temperature are adjusted, such that the particle size and the pore size of the particles may be freely adjusted within ranges of 1~1000 μm and 1~150 nm, respectively.

Therefore, because the mesoporous silica particles prepared according to the present invention have various pore sizes, a large surface area, and a high pore volume, they may be widely used in catalysts, adsorbents, low dielectrics, and separation and purification processes, and as well, may be useful as a template for the preparation of new porous materials, such as porous carbon.

A better understanding of the present invention may be obtained in light of the following examples, which are set forth to illustrate, but are not to be construed to limit the present invention.

EXAMPLE 1

Preparation of Mesoporous Silica Particles 1 mol of tetraethyl orthosilicate as a silica precursor, 0.34 mol of n-dodecylamine as an alkylamine-based surfactant, 0.06 mol of di-(2-ethylhexyl)phosphoric acid as a phosphoric acid-based cosurfactant, 38 mol of water, and 0.9 mol of ethanol were loaded into a reactor, and were then stirred for 10~30 min. Further, in a separate reactor, $4.8 \times 10^{-3}$ mol of hydrochloric acid solution was prepared. The hydrochloric acid solution was added with the above prepared reaction mixture while stirring it, after which the obtained reaction mixture was allowed to react for 1~24 hours. Thereafter, the synthesized mesoporous silica particles were filtered using filter paper, washed with ethanol, and dried in a drying oven. The dried mesoporous silica particles were burned at 550° C. for 7 hours using a tubular electric furnace in the air to thus remove the surfactant, thereby preparing mesoporous silica particles according to the present invention.

EXAMPLES 2~10

Mesoporous silica particles were prepared in the same manner as in Example 1, with the exception that the molar ratios of tetraethyl orthosilicate, n-dodecylamine, di-(2-ethylhexyl)phosphoric acid, water, ethanol, and hydrochloric acid loaded into the reactors were changed as shown in Table 1 below.

TABLE 1

| | Molar Composition of Reaction Materials | | | | | |
|---|---|---|---|---|---|---|
| | Tetraethyl orthosilicate | n-Dodecylamine | Di-(2-ethylhexane) phosphoric acid | Water | Ethanol | Hydrochloric acid |
| Ex. 1 | 1 | 0.34 | 0.06 | 38 | 0.9 | $4.8 \times 10^{-3}$ |
| Ex. 2 | 1 | 0.34 | 0.12 | 38 | 0.9 | $4.8 \times 10^{-3}$ |
| Ex. 3 | 1 | 0.34 | 0.18 | 38 | 0.9 | $4.8 \times 10^{-3}$ |
| Ex. 4 | 1 | 0.34 | 0.24 | 38 | 0.9 | $4.8 \times 10^{-3}$ |
| Ex. 5 | 1 | 0.34 | 0.12 | 65 | 0.9 | $4.8 \times 10^{-3}$ |
| Ex. 6 | 1 | 0.34 | 0.12 | 131 | 0.9 | $9.5 \times 10^{-3}$ |
| Ex. 7 | 1 | 0.34 | 0.12 | 262 | 0.9 | $19.0 \times 10^{-3}$ |
| Ex. 8 | 1 | 0.34 | 0.12 | 262 | 0.9 | — |
| Ex. 9 | 1 | 0.34 | 0.12 | 262 | 0.9 | $19.0 \times 10^{-3}$ |
| Ex. 10 | 1 | 0.34 | 0.12 | 262 | 0.9 | $38.0 \times 10^{-3}$ |

EXAMPLES 11~20

Mesoporous silica particles were prepared in the same manner as in Examples 1~10, with the exception that the synthesized mesoporous silica particles were further subjected to a hydrothermal reaction in an oven at 100° C. for 24 hours using a closed high temperature/high pressure reactor.

COMPARATIVE EXAMPLES 1~6

Mesoporous silica particles were prepared in the same manner as in Example 1, with the exception that the phosphoric acid-based cosurfactant was not added, and the molar ratios of tetraethyl orthosilicate, n-dodecylamine, water, ethanol, and hydrochloric acid were changed as shown in Table 2 below.

TABLE 2

| | Molar Composition of Reaction Materials | | | | |
|---|---|---|---|---|---|
| | Tetraethyl orthosilicate | n-Dodecylamine | Water | Ethanol | Hydrochloric acid |
| C. Ex. 1 | 1 | 0.34 | 38 | 0.9 | — |
| C. Ex. 2 | 1 | 0.34 | 38 | 0.9 | $1.2 \times 10^{-3}$ |
| C. Ex. 3 | 1 | 0.34 | 38 | 0.9 | $2.4 \times 10^{-3}$ |
| C. Ex. 4 | 1 | 0.34 | 38 | 0.9 | $3.6 \times 10^{-3}$ |
| C. Ex. 5 | 1 | 0.34 | 38 | 0.9 | $4.8 \times 10^{-3}$ |
| C. Ex. 6 | 1 | 0.34 | 38 | 0.9 | $19.0 \times 10^{-3}$ |

COMPARATIVE EXAMPLES 7~12

Mesoporous silica particles were prepared in the same manner as in Comparative Examples 1~6, with the exception that the synthesized mesoporous silica particles were further subjected to a hydrothermal reaction in an oven at 100° C. for 24 hours using a closed high temperature/high pressure reactor.

EXPERIMENTAL EXAMPLE 1

Structural Properties of Mesoporous Silica Particles

In order to evaluate the structural properties of the mesoporous silica particles prepared with the addition of the alkylamine-based surfactant and the phosphoric acid-based cosurfactant according to the present invention and the mesoporous silica particles prepared without the addition of the phosphoric acid-based cosurfactant, the mesoporous silica particles prepared in Examples 8~10 and Comparative Examples 2~3, as typical examples, were measured for surface area, total pore volume, and pore size thereof. The results are shown in Table 3 below.

TABLE 3

|  | Surface Area (m$^2$/g) | Total Pore Volume (cm$^3$/g) | Pore Size (nm) |
| --- | --- | --- | --- |
| Ex. 8 | 670 | 0.76 | 3.5 |
| Ex. 9 | 908 | 0.85 | 3.2 |
| Ex. 10 | 824 | 0.58 | 3.5 |
| C. Ex. 2 | 993 | 0.76 | 2.5 |
| C. Ex. 3 | 1,014 | 0.85 | 2.6 |

As is apparent from Table 3, when the phosphoric acid-based cosurfactant was added, the pore size was seen to increase to be greater than when the phosphoric acid-based cosurfactant was not added.

EXPERIMENTAL EXAMPLE 2

Structural Properties of Mesoporous Silica Particles Through Hydrothermal Reaction In order to evaluate the effect of the hydrothermal reaction on the mesoporous silica particles according to the present invention, the following experiment was conducted.

(1) Measurement of Surface Area, Total Pore Volume, Pore Size of Particles

In order to evaluate the structural properties of the mesoporous silica particles prepared in Example 2 and Comparative Example 5 and the mesoporous silica particles (Example 12 and Comparative Example 11) further subjected to a hydrothermal reaction in an oven at 100° C. for 24 hours using a closed high temperature/high pressure reactor, the surface area, the total pore volume, and the pore size of the particles were measured. The results are shown in Table 4 below.

TABLE 4

|  | Surface Area (m$^2$/g) | Total Pore Volume (cm$^3$/g) | Pore Size (nm) |
| --- | --- | --- | --- |
| Ex. 2 | 835 | 0.75 | 2.7 |
| Ex. 12 | 371 | 2.57 | 22.7 |
| C. Ex. 5 | 1,070 | 0.87 | 2.7 |
| C. Ex. 11 | 488 | 2.11 | 13.5 |

As shown in Table 4, it could be seen that the mesoporous silica particles (Example 12 and Comparative Example 11) after the hydrothermal reaction had pore sizes increased by 20 nm and 9 nm, respectively, compared to the mesoporous silica particles (Example 2 and Comparative Example 5) before the hydrothermal reaction, and accordingly, had increased total pore volumes and decreased surface areas.

Thereby, the pore size of the mesoporous silica particles was confirmed to increase through the hydrothermal reaction.

(2) Observation Using Scanning Electron Microscope (SEM) and Transmission Electron Microscope (TEM)

The prepared mesoporous silica particles were observed using an SEM and a TEM. The results are shown in FIGS. 1 and 2.

Figure 1:
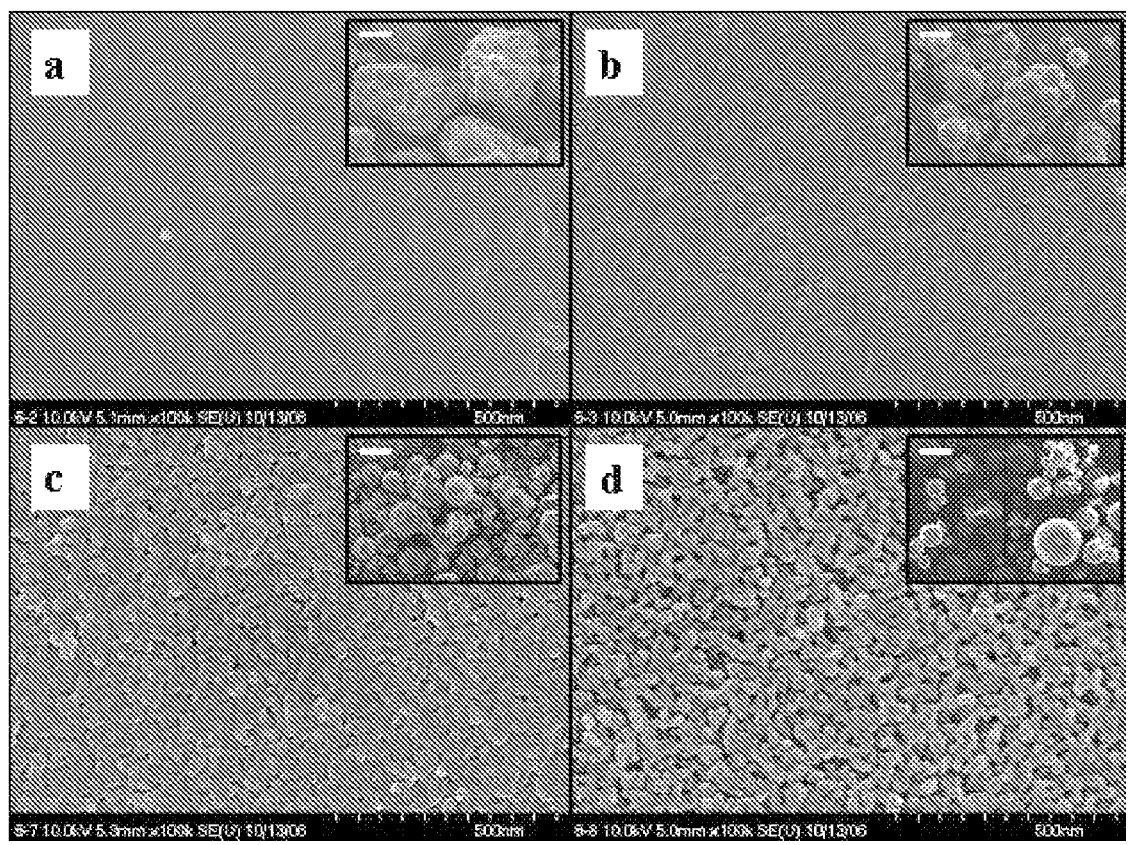
FIG. 1 is scanning electron microscope (SEM) images illustrating the mesoporous silica particles prepared according to the present invention and comparative examples.
Figure 2:
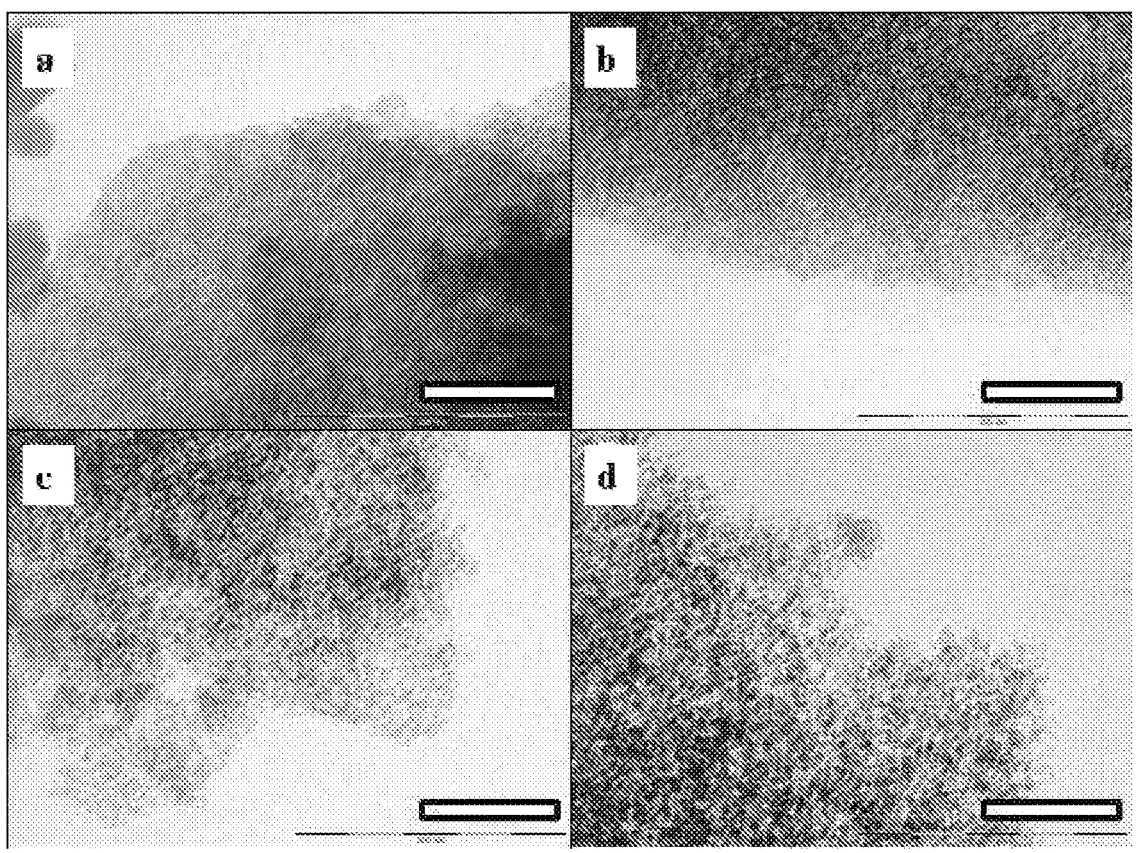

As shown in FIGS. 1 and 2, (a) illustrates the mesoporous silica particles (Comparative Example 5) prepared with the addition of the conventional alkylamine-based surfactant, (b) illustrates the mesoporous silica particles (Example 2) prepared with the addition of the alkylamine-based surfactant and the phosphoric acid-based cosurfactant according to the present invention, (c) illustrates the mesoporous silica particles (Comparative Example 11) having an increased pore size obtained by further subjecting the mesoporous silica particles prepared with the addition of the alkylamine-based surfactant to a hydrothermal reaction, and (d) illustrates the mesoporous silica particles (Example 12) having an increased pore size obtained by further subjecting the mesoporous silica particles prepared with the addition of the alkylamine-based surfactant and the phosphoric acid-based cosurfactant according to the present invention to a hydrothermal reaction. The drawings inserted in FIG. 1 are highly magnified SEM images of these particles and surfaces.

Comparing (a) and (b) of FIGS. 1 and 2, when only the conventional alkylamine-based surfactant was used, the particles were aggregated, undesirably making it difficult to form pores. However, when the phosphoric acid-based cosurfactant was added according to the present invention, the particles could be seen to be individually and uniformly dispersed and distributed, thereby uniformly forming the pores.

Further, from (c) and (d), the pore size of the mesoporous silica particles was seen to increase through the hydrothermal reaction.

(3) Change in Pore Size of Particles Depending on Hydrothermal Reaction Temperature In order to investigate the change in the pore size of the mesoporous silica particles according to the present invention at different hydrothermal reaction temperatures, the following experiment was conducted.

In cases where the mesoporous silica particles of Example 2 were not subjected to a hydrothermal reaction and where the hydrothermal reaction was conducted at temperatures of 70° C., 100° C., and 130° C., the surface area, the total pore volume, and the pore size of the particles were measured. The results are shown in Table 5 below.

TABLE 5

|  | Hydrothermal Temp. (° C.) | Surface Area (m$^2$/g) | Total Pore Volume (cm$^3$/g) | Pore Size (nm) |
| --- | --- | --- | --- | --- |
| Ex. 2 | — | 835 | 0.75 | 2.7 |
|  | 70 | 579 | 2.16 | 11.5 |
|  | 100 | 371 | 2.57 | 22.7 |
|  | 130 | 200 | 2.67 | 45.5 |

As is apparent from Table 5, as the hydrothermal reaction temperature was increased, the pore size of the mesoporous silica particles was increased. When the hydrothermal reaction temperature was increased from 70° C. in increments of 30° C., the pore size was approximately doubled. Thus, it is expected that the preparation of mesoporous silica particles having a pore size of 100 nm or more can be realized by controlling the hydrothermal reaction temperature.

(4) Nitrogen Adsorption/Desorption

In order to investigate the effect of the hydrothermal reaction on the pore size of the mesoporous silica particles according to the present invention, the following experiment was conducted.

The mesoporous silica particles prepared in Examples 2 and Comparative Example 5 and the mesoporous silica particles (Example 12 and Comparative Example 11) further subjected to a hydrothermal reaction at 100° C. were respectively loaded into four chambers. While nitrogen was slowly injected, the amount that was adsorbed depending on the change in pressure was measured. Then, while nitrogen was slowly eliminated using a vacuum, the amount that was desorbed depending on the change in pressure was measured, from which the pore size distribution was calculated. The results are shown in FIGS. 3 and 4.

FIG. 3 illustrates the nitrogen adsorption/desorption isotherm of the mesoporous silica particles of Examples 2 and 12 according to the present invention and the pore size distribution curve corresponding thereto, and FIG. 4 illustrates the nitrogen adsorption/desorption isotherm of the mesoporous silica particles prepared with the addition of the conventional alkylamine-based surfactant in Comparative Examples 5 and 11 and the pore size distribution curve corresponding thereto. In these graphs, ○ shows the case in which a hydrothermal reaction was not conducted (Example 2 and Comparative Example 5), ∇ shows the case in which a hydrothermal reaction was conducted (Example 12 and Comparative Example 11), ○ and ∇ show nitrogen adsorption, and ● and ▼ show nitrogen desorption.

As shown in FIGS. 3 and 4, in the case where the hydrothermal reaction was not conducted, the mesoporous silica particles had a pore size distribution less than 10 nm. However, in the case where the hydrothermal reaction was conducted, the pore size distribution of the mesoporous silica particles was increased to 10~40 nm. In particular, in the case where the phosphoric acid-based cosurfactant was added, the pores were mainly distributed in the range of 30 nm, from which it was concluded that the degree of increase of the pore size was greater and the pore size was more uniform than when the phosphoric acid-based cosurfactant was not added.

Consequently, upon the preparation of mesoporous silica particles, the phosphoric acid-based cosurfactant is added, and the hydrothermal reaction is conducted, thereby synthesizing mesoporous silica particles having a larger particle size and more uniform pores than conventional mesoporous silica particles.

As described hereinbefore, the present invention provides mesoporous silica particles and a method of preparing the same. According to the present invention, the mesoporous silica particles are prepared using a phosphoric acid-based cosurfactant, which functions to stabilize the surface of the particles to prevent the aggregation of the particles, thereby uniformly distributing the particles. Furthermore, through a hydrothermal reaction, the mesoporous silica particles may be imparted with various pore sizes, a large surface area, and a high pore volume. Thus, the mesoporous silica particles may be widely used in catalysts, adsorbents, low dielectrics, and separation and purification processes, and as well, may be used as templates for the preparation of novel porous materials, such as porous carbon.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing mesoporous silica particles, comprising:
   (1) mixing a silica precursor, an alkylamine-based surfactant, and a phosphoric acid-based cosurfactant, thus preparing a mixture solution (a mother liquor);
   (2) adding or not adding the mixture solution with an acid solution, and conducting stirring, thus obtaining mesoporous silica particles; and
   (3) subjecting the mesoporous silica particles obtained after conducting stirring to a hydrothermal reaction at a range of 100° C. to 250° C. for a range of 1 to 24 hours in presence of the mother liquor thus increasing a pore size of the mesoporous silica particles; and
   (4) thermally treating the mesoporous silica particles at 300~900° C. for 1~24 hours,
   wherein the mesoporous silica particles have a particle size of in a range of 1 to 1000 micrometers, and
   wherein the mesoporous silica particles have a pore size in a range of 22.7 to 45.5 nanometers.

2. The method as set forth in claim 1, wherein the silica precursor is selected from among tetramethyl orthosilicate, tetraethyl orthosilicate, tetrapropyl orthosilicate, tetrabutyl orthosilicate, and mixtures thereof.

3. The method as set forth in claim 1, wherein the alkylamine-based surfactant is a straight or branched chain alkylamine having 4~24 carbons.

4. The method as set forth in claim 3, wherein the alkylamine-based surfactant is n-dodecylamine.

5. The method as set forth in claim 1, wherein the phosphoric acid-based cosurfactant is selected from among phosphorous acid derivatives, phosphoric acid derivatives, phosphonic acid derivatives, and phosphinic acid derivatives.

6. The method as set forth in claim 5, wherein the phosphoric acid-based cosurfactant is di-(2-ethylhexyl)phosphoric acid.

7. The method as set forth in claim 1, wherein the mixing the silica precursor, the alkylamine-based surfactant, and the phosphoric acid-based cosurfactant is conducted at a molar ratio of silica precursor to alkylamine-based surfactant to phosphoric acid-based cosurfactant of 1:0.1~0.5:0.00001~0.5.

8. The method as set forth in claim 1, wherein, in a case where the acid solution is added, the acid solution is any one selected from among hydrochloric acid, nitric acid, and sulfuric acid, and a molar ratio of silica precursor to acid solution is 1:0.00001~0.4.

* * * * *